F. VLACH.
HOSE COUPLING.
APPLICATION FILED AUG. 12, 1907.
938,095.
Patented Oct. 26, 1909.
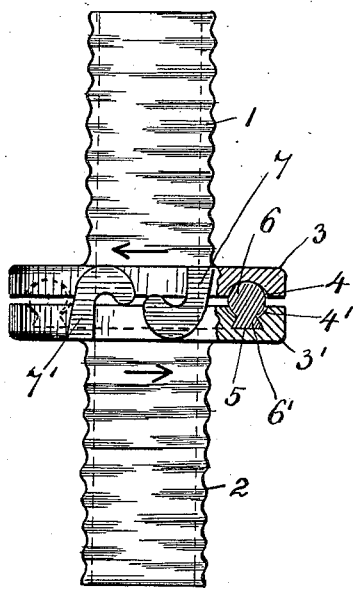
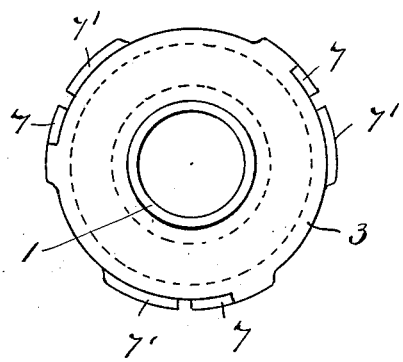
Witnesses
Carl Haerting
Joseph Schlenker
Inventor
Frank Vlach
By R. of N. Klotz
Atty.

UNITED STATES PATENT OFFICE.

FRANK VLACH, OF CHICAGO, ILLINOIS.

HOSE-COUPLING.

938,095.     Specification of Letters Patent.     Patented Oct. 26, 1909.

Application filed August 12, 1907. Serial No. 388,112.

*To all whom it may concern:*

Be it known that I, FRANK VLACH, a subject of the Emperor of Austria-Hungary, and residing at Chicago, in the county of Cook and State of Illinois, have invented a new and useful Improvement in Hose-Couplings, of which the following is a complete specification.

This invention relates to improvements in hose couplings and more particularly to a hose coupling in which the gasket in the joint tends to hold the coupling in locked position.

The object of the invention is to provide a coupling in which the interlocking parts are firmly held together by pressure exerted on the coupling sections by the packing which closes the joint therebetween.

It is a further object of the invention to provide a very cheap and simple construction, which is easy to operate and not liable to get out of repair with ordinary usage, and which will afford a very tight joint for the hose.

The invention consists of the matters hereinafter described in the specification and more fully pointed out and defined in the appended claim.

In the drawings: Figure 1 is a side elevation partly in section, of a device embodying my invention. Fig. 2 is an end elevation of the same.

As shown in said drawings: 1 and 2 indicate respectively the connecting sleeves of the sections of the coupling and by means of which the sections are attached to the hose ends. The adjacent ends of said sleeves are each provided with a peripheral flange, indicated by 3 and 3' respectively, which provide the meeting faces of the coupling. Each flange is provided in its outer face, or that adjacent the other flange, with a groove or channel 4—4', concentric with the bore of the sleeve and each of which is oval in cross section, or broader than deep, and that in the flange 3' opens at its bottom into an inner groove or seat 5 which increases in width downwardly or inwardly, providing one member of a dovetail joint. A gasket or packing ring 6 is engaged in the seat 5 by means of a rib 6' thereon which is complemental with and is forced into said seat. Said gasket is cylindrical in cross section and projects outwardly from the flange 3' into the groove 4 in the flange 3 when the coupling is connected, and is of sufficient size to normally hold said flanges out of contact with each other as shown in Fig. 1. Inasmuch as the grooves 4 and 4' are broader than deep the gasket is permitted to slightly flatten under the pressure caused thereon in connecting the sections of the coupling together. Each of said flanges is provided on its periphery with a plurality of longitudinally directed hooks or knuckles, indicated respectively by 7 and 7'. Said knuckles as shown are formed integrally with the flanges and those on one flange face oppositely from those on the other and are adapted to interlock therewith.

The operation is as follows: When connecting the coupling the two sections are placed together with the gasket in the groove 4 of the flange 3. The sections are then forced toward each other, thereby compressing the gasket sufficiently to permit the ends of the knuckles or hooks 7—7' to pass over each other and interlock when the sections are rotated in the directions indicated by the arrows in Fig. 1. The resiliency of the gasket acts to force the sections oppositely and therefore holds the knuckles interlocked until the sections are again forced together and rotated in the opposite direction.

Obviously the gasket may be varied in form and many other details of construction may be varied without departing from the principles of my invention.

I claim as my invention:

In a device of the class described the combination with a sleeve, of a broad peripheral flange on one end thereof having an annular undercut groove in its face opposite from said sleeve, a gasket rigidly engaged in said groove and having a rounded outer face, a sleeve in axial alinement with the aforesaid sleeve, a broad peripheral flange on the end thereof adjacent the aforesaid flange and having an annular groove in the face thereof adjacent said gasket and of a cross sectional curvature greater than the cross sectional curvature of the face of said gasket, and a plurality of hooks on the edge of each flange, those on each flange being adapted to overlap the other flange and engage the hooks thereon and when forced into engagement to draw the flanges into close contact with each other.

In witness whereof, I have hereunto subscribed my name in the presence of two witnesses.

FRANK VLACH.

Witnesses:
CARL HAERTING,
JOSEPH SCHLENKER.